United States Patent [19]

Muramoto

[11] Patent Number: 5,315,386
[45] Date of Patent: May 24, 1994

[54] TELEVISION RECEIVER AND DECODER FOR CLOSED-CAPTION BROADCAST PROVIDING SIMPLE CHARACTER DISPLAY SHOWING EXISTENCE OF A CLOSED-CAPTION SIGNAL IRRESPECTIVE OF USER SELECTION OF CLOSED CAPTION DEMODULATION

[75] Inventor: Yoshifumi Muramoto, Nagaokakyo, Japan

[73] Assignee: Mitsubishi Denki Kabushiki Kaisha, Tokyo, Japan

[21] Appl. No.: 25,245

[22] Filed: Mar. 2, 1993

[30] Foreign Application Priority Data

Mar. 4, 1992 [JP] Japan .................. 4-046537

[51] Int. Cl.⁵ .............. H04N 7/087; H04N 5/50; H04N 7/08; H04N 5/445
[52] U.S. Cl. .................. 348/569; 348/461; 348/726
[58] Field of Search ........ 358/147, 142, 146, 192.1, 358/188, 183, 22; H04N 5/50, 7/08, 7/087, 5/445, 5/44, 5/45, 5/278, 5/272, 5/268, 5/262, 5/265

[56] References Cited

U.S. PATENT DOCUMENTS

| | | | |
|---|---|---|---|
| 4,520,392 | 5/1985 | Cox et al. | 358/147 |
| 4,633,297 | 12/1986 | Skerlos et al. | 358/22 |
| 5,223,930 | 6/1993 | Zato | 358/147 |

FOREIGN PATENT DOCUMENTS

| | | | |
|---|---|---|---|
| 59-224989 | 12/1984 | Japan | 358/142 |
| 1125185 | 5/1989 | Japan | H04N 7/08 |
| 4154288 | 5/1992 | Japan | H04N 7/08 |
| 4313982 | 11/1992 | Japan | H04N 7/08 |

*Primary Examiner*—James J. Groody
*Assistant Examiner*—Safet Metjahic

[57] ABSTRACT

A television receiver includes a closed-caption signal demodulator, an existence-of-closed-caption-signal discriminator located upstream of the demodulator, and a character memory for supplying a simple character, meaning that a closed-caption signal exists in an image signal, onto the screen of the television receiver. This simple character is supplied to the screen upon receipt of a discrimination signal, indicating that a closed-caption signal, exists in an image signal from the existence-of-closed-caption-signal discriminator. With this television receiver, the user can recognize, at a time prior to actual selection of closed-caption signal demodulation, whether or not a closed-caption signal exists, in an image signal.

12 Claims, 4 Drawing Sheets

TELEVISION RECEIVER AND DECODER FOR CLOSED-CAPTION BROADCAST PROVIDING SIMPLE CHARACTER DISPLAY SHOWING EXISTENCE OF A CLOSED-CAPTION SIGNAL IRRESPECTIVE OF USER SELECTION OF CLOSED CAPTION DEMODULATION

BACKGROUND OF THE INVENTION

1. Field of the Invention:

This invention relates to a television receiver in which anytime in the existence of a closed-caption signal in an image signal of television broadcast, a display allowing the user to recognize the closed-caption signal can be made on the screen. Also the invention concerns a closed-caption-broadcast decoder for sampling a closed-caption signal to an image signal of television broadcast for mixing therewith and for outputting the composite signal to an external television receiver.

2. Description of the Related Art:

In North America, for people who cannot understand English and people who have difficulty in hearing, closed-caption broadcast, displaying closed caption on the screen of television broadcast, has been standardized and set about in recent years. Since this closed-caption broadcast adopts a transmission method in which character data are superposed in a vertical retrace time and are displayed on the screen, the closed-caption broadcast can coexist with the existing television broadcast. The closed-caption broadcast by this method requires a special decoder. Consequently it is necessary to connect a decoder, for closed-caption broadcast, to the external television receiver; no television receiver with a built-in decoder for closed-caption broadcast is known at the present time.

FIG. 3 of the accompanying drawings is a block diagram showing the circuit of a conventional television receiver in which a closed-caption signal demodulator of the known type is mounted. In FIG. 3, reference numeral 1 designates an image signal; 2, a closed-caption signal demodulating unit; 3, a closed-caption signal to be output from the closed-caption signal demodulating unit 2; 4, a mixer for mixing the image signal 1 and the closed-caption signal 3; 5, a microcomputer for controlling the closed-caption signal demodulating unit 2; and 6, a control signal to be output from the microcomputer 5.

The closed-caption signal demodulating unit 2 includes a character memory (storage) 11 containing data of the closed-caption signal 3, a closed-caption signal demodulator 9, and an output circuit 10 for outputting the closed-caption signal 3 to the mixer 4. A decoder for mixing a closed-caption signal and an image signal and outputting the composite signal to the external television receiver also has the same construction.

The operation of this television receiver will now be described. The input image signal 1 is divided into two parts, one to be input to the closed-caption signal demodulator 9 of the closed-caption signal demodulating unit 2 and the other to be input to the mixer 4.

In this television receiver, when closed-caption signal demodulation is selected by the user, a control signal 6 meaning "closed-caption signal demodulation is needed" is sent from the microcomputer 5 to the closed-caption signal demodulating unit 2, whereupon the closed-caption signal demodulator 9 will demodulate a code signal 12 for obtaining a closed-caption signal 3 from an image signal 1. Then a character signal 14 corresponding the code signal 12 is read from the character memory 11 and is sent to the output circuit 10.

The output circuit 10 outputs to the mixer 4 the character signal 14, which is output from the character memory 11, as the closed-caption signal 3. Then the mixer 4 mixes the image signal 1 and the closed-caption signal 3, and the composite signal is displayed on the screen of the television receiver (not shown).

The foregoing description concerning the operation of the television receiver in which the closed-caption signal demodulating unit is mounted can be also applied to the operation of a closed-caption-broadcast decoder to be connected to an external television receiver.

However, with the foregoing arrangements of this invention, since a closed-caption signal will not be demodulated unless the user selects closed-caption display, he/she cannot recognize, before selection, whether or not there closed-caption broadcast in the television broadcast is included.

SUMMARY OF THE INVENTION

Accordingly it is an object of this invention to provide a television receiver, with which the user can recognize whether or not any code signal exists in an image signal for generating a closed-caption signal, irrespective of whether or not demodulation of the closed-caption signal is selected by the user.

Another object of the invention is to provide a closed-caption-broadcast decoder with which the user can recognize whether or not any code signal exists in an image signal for generating a closed-caption signal, irrespective of whether or not demodulation of the closed-caption signal is selected by the user.

According to a first aspect of the invention, there is provided a television receiver for closed-caption broadcast in which an image signal and a closed-caption signal are to be displayed on a screen, comprising:

(a) a closed-caption signal demodulating unit for demodulating a closed-caption signal in an image signal of television broadcast and for outputting the demodulated closed-caption signal for closed-caption display, said closed-caption signal demodulating unit including (i) an existence-of-closed-caption-signal discriminator for discriminating whether or not, for closed-caption broadcast, a closed-caption signal exists in an image signal of television broadcast, (ii) a character memory for outputting a predetermined simple character meaning "existence of a closed-caption signal" when said existence-of-closed-caption-signal discriminator judges that the closed-caption signal exists, and (iii) an output circuit for inputting the simple character output from said character memory and for outputting the simple character output as converted into a closed-caption signal;

(b) a mixer for mixing the closed-caption signal, which is output from said output circuit, with the image signal and for outputting the composite signal as a screen display signal; and (c) a screen on which an image is to be displayed based on the screen display signal from said mixer, whereby the user may recognize, from the simple character displayed on said screen, if closed-caption broadcast is available or not.

According to a second aspect of the invention, there is provided a television receiver for closed-caption broadcast in which an image signal and a closed-caption signal are to be displayed on a screen, comprising:

(a) a closed-caption signal demodulating unit for demodulating a closed-caption signal in an image signal of television broadcast and for outputting the demodulated closed-caption signal for closed-caption display, said closed-caption signal demodulating unit including (i) an existence-of-closed-caption-signal discriminator for discriminating whether or not, for closed-caption broadcast, a closed-caption signal exists in an image signal of television broadcast, (ii) a closed-caption signal demodulator located downstream of said existence-of-closed-caption-signal discriminator for demodulating a code signal to generate the closed-caption signal from the image signal of television broadcast, (iii) a character memory for outputting a predetermined simple character meaning "existence of a closed-caption signal" when said existence-of-closed-caption-signal discriminator judges that the closed-caption signal exists and for outputting a character signal corresponding to the code signal output from said closed-caption signal demodulator, and (iv) an output circuit for inputting the simple character output from said character memory and the character signal for closed-caption display and for outputting the simple character and the character signal as the closed-caption signal;

(b) a mixer for mixing the closed-caption signal, which is output from said output circuit, with the image signal and for outputting the composite signal as a screen display signal;

(c) a screen on which an image is to be displayed based on the screen display signal from said mixer, whereby the user may recognize, from the simple character displayed on said screen, if closed-caption broadcast is available or not; and (d) a controller for controlling said closed-caption signal demodulating unit to perform closed-caption display when the user recognizes, from the simple character displayed on the screen, that closed-caption broadcast is available and subsequently selects closed-caption broadcast.

According to a third aspect of the invention, there is provided a television receiver for closed-caption broadcast in which an image signal and a closed-caption signal are to be displayed on a screen, comprising:

(a) a closed-caption signal demodulating unit for demodulating a closed-caption signal in an image signal of television broadcast and for outputting the demodulated closed-caption signal for closed-caption display, said closed-caption signal demodulating unit including (i) an existence-of-closed-caption-signal discriminator for discriminating whether or not a closed-caption signal exists, for closed-caption broadcast, in an image signal of television broadcast, (ii) a closed-caption signal demodulator located downstream of said existence-of-closed-caption-signal discriminator for demodulating a code signal to generate the closed-caption signal from the image signal of television broadcast, (iii) a first character memory for outputting a predetermined simple character meaning "existence of a closed-caption signal" when said existence-of-closed-caption-signal discriminator judges that the closed-caption signal exists, (iv) a second character memory, for closed-caption display, for outputting a character signal corresponding to the code signal output from said closed-caption signal demodulator, and (v) an output circuit for inputting the simple character output from said first character memory and the character signal input from said second character memory and for outputting the simple character and the character signal as converted into a closed-caption signal;

(b) a mixer for mixing the closed-caption signal, which is output from said output circuit, with the image signal and for outputting the composite signal as a screen display signal;

(c) a screen on which an image is to be displayed based on the screen display signal from said mixer, whereby the user may recognize, from the simple character displayed on said screen, if closed-caption broadcast is available or not; and (d) a controller for controlling said closed-caption signal demodulator to perform closed-caption display when the user recognizes, from the simple character displayed on the screen, that closed-caption broadcast is available and then subsequently selects closed-caption broadcast.

According to a fourth aspect of the invention, there is provided a decoder, for closed-caption broadcast, which inputs an image signal of television broadcast, samples a closed-caption signal for closed-caption broadcast and mixes the closed-caption signal with the image signal, said decoder comprising:

(a) a closed-caption signal demodulating unit for demodulating a closed-caption signal in an image signal of television broadcast and for outputting the demodulated closed-caption signal for closed-caption display, said closed-caption signal demodulating unit including (i) an existence-of-closed-caption-signal discriminator for discriminating whether or not a closed-caption signal exists, for closed-caption broadcast, in an image signal of television broadcast, (ii) a character memory for outputting a predetermined simple character meaning "existence of a closed-caption signal" when said existence-of-closed-caption-signal discriminator judges that the closed-caption signal exists, and (iii) an output circuit for inputting both the simple character output from said character memory and the character signal corresponding to the code signal output from said closed-caption signal demodulator and for outputting the simple character output as converted into a closed-caption signal; and (b) a mixer for mixing the closed-caption signal, which is output from said output circuit, with the image signal and for outputting the composite signal as a screen display signal, whereby a closed-caption signal indicating "existence of a closed-caption signal" is output to an external television receiver.

According to a fifth aspect of the invention, there is provided a decoder, for closed-caption broadcast, which inputs an image signal of television broadcast, samples a closed-caption signal for closed-caption broadcast and mixes the closed-caption signal with the image signal, said decoder comprising:

(a) a closed-caption signal demodulating unit for demodulating a closed-caption signal in an image signal of television broadcast and for outputting the demodulated closed-caption signal for closed-caption display, said closed-caption signal demodulating unit including (i) an existence-of-closed-caption-signal discriminator for discriminating whether or not a closed-caption signal exists, for closed-caption broadcast, in an image signal of television broadcast, (ii) a closed-caption signal demodulator located downstream of said existence-of-closed-caption-signal discriminator for demodulating a code signal to generate the closed-caption signal from the image signal of television broadcast, (iii) a character memory for outputting a predetermined simple character meaning "existence of a closed-caption signal" when said existence-of-closed-caption-signal discriminator judges that the closed-caption signal exists, and (iv) an output circuit for inputting the simple character output from said character memory and the character signal and for outputting the simple character and the character signal as converted into a closed-caption signal;

(b) a mixer for mixing the closed-caption signal, which is output from said output circuit, with the image signal and for outputting the composite signal as a screen display signal, whereby a closed-caption signal indicating "existence of a closed-caption signal" is output to an external television receiver; and (c) a controller for controlling said closed-caption signal demodulator to output a closed-caption broadcast signal to the external television receiver when the user recognizes, from the simple character displayed on the screen, that closed-caption broadcast is available and then subsequently selects closed-caption broadcast.

According to a sixth aspect of the invention, there is provided a decoder, for closed-caption broadcast, which inputs an image signal of television broadcast, samples a closed-caption signal for closed-caption broadcast and mixes the closed-caption signal with the image signal, said decoder comprising:

(a) a closed-caption signal demodulating unit for demodulating a closed-caption signal in an image signal of television broadcast and for outputting the demodulated closed-caption signal for closed-caption display, said closed-caption signal demodulating unit including (i) an existence-of-closed-caption-signal discriminator for discriminating whether or not a closed-caption signal exists, for closed-caption broadcast, in an image signal of television broadcast, (ii) a closed-caption signal demodulator located downstream of said existence-of-closed-caption-signal discriminator for demodulating a code signal to generate the closed-caption signal from the image signal of television broadcast, (iii) a first character memory for outputting a predetermined simple character meaning "existence of a closed-caption signal" when said existence-of-closed-caption-signal discriminator judges that the closed-caption signal exists, (iv) a second character memory, for closed-caption display, for outputting a character signal corresponding to the code signal output from said closed-caption signal demodulator, and (v) an output circuit for inputting the simple character output from said first character memory the character signal output from said second character memory and for outputting the simple character and the character signal as converted into a closed-caption signal;

(b) a mixer for mixing the closed-caption signal, which is output from said output circuit, with the image signal and for outputting the composite signal as a screen display signal, whereby a closed-caption signal indicating "existence of a closed-caption signal" is output to an external television receiver; and (c) a controller for controlling said closed-caption signal demodulator to output a closed-caption signal to the external television receiver when the user recognizes, from the simple character displayed on the screen, that closed-caption broadcast is available and then subsequently selects closed-caption broadcast.

With the television receiver, for closed-caption broadcast, according to the first aspect of the invention, the user can recognize, by the simple character displayed on the screen of the television receiver, whether or not closed-caption broadcast is available for the television broadcast now on air, irrespective of selection of closed-caption demodulation.

With the television receiver, for closed-caption broadcast, according to the second and third aspects of the invention, the user can recognize, by the simple character displayed on the screen of the television receiver, whether or not closed-caption broadcast is available for the television broadcast now on air, irrespective of selection of closed-caption demodulation, and can then select closed-caption display to enjoy the closed-caption broadcast.

With the decoder according to the fourth aspect of the invention, the user can recognize, by the simple character displayed on the screen of the external television receiver, whether or not closed-caption broadcast is available for the television broadcast now on air, irrespective of selection of closed-caption demodulation.

With the decoder according to the fifth and sixth aspects of the invention, the user can recognize, by the simple character displayed on the screen of the external television receiver, whether or not closed-caption broadcast is available for the television broadcast now on air, irrespective of selection of closed-caption demodulation and can then select closed-caption display on the decoder to enjoy the closed-caption broadcast on the external television receiver.

DESCRIPTION OF THE PREFERRED EMBODIMENT

Figure 3:
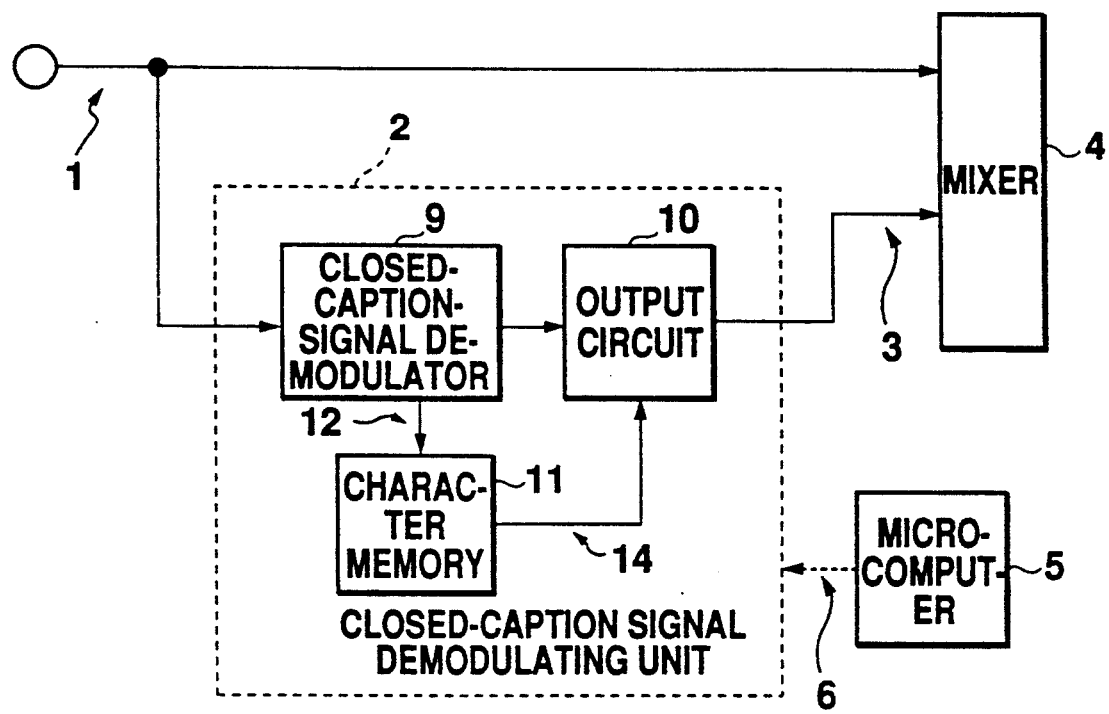
FIG. 3 is a block diagram showing a part of a conventional television receiver for closed-caption broadcast.

One embodiment of this invention will now be described with reference to the accompanying drawings. Parts or elements similar to those of the conventional art of FIG. 3 are designated by like reference numerals, and repetition of their description is omitted here for the sake of clarity.

Figure 1A:
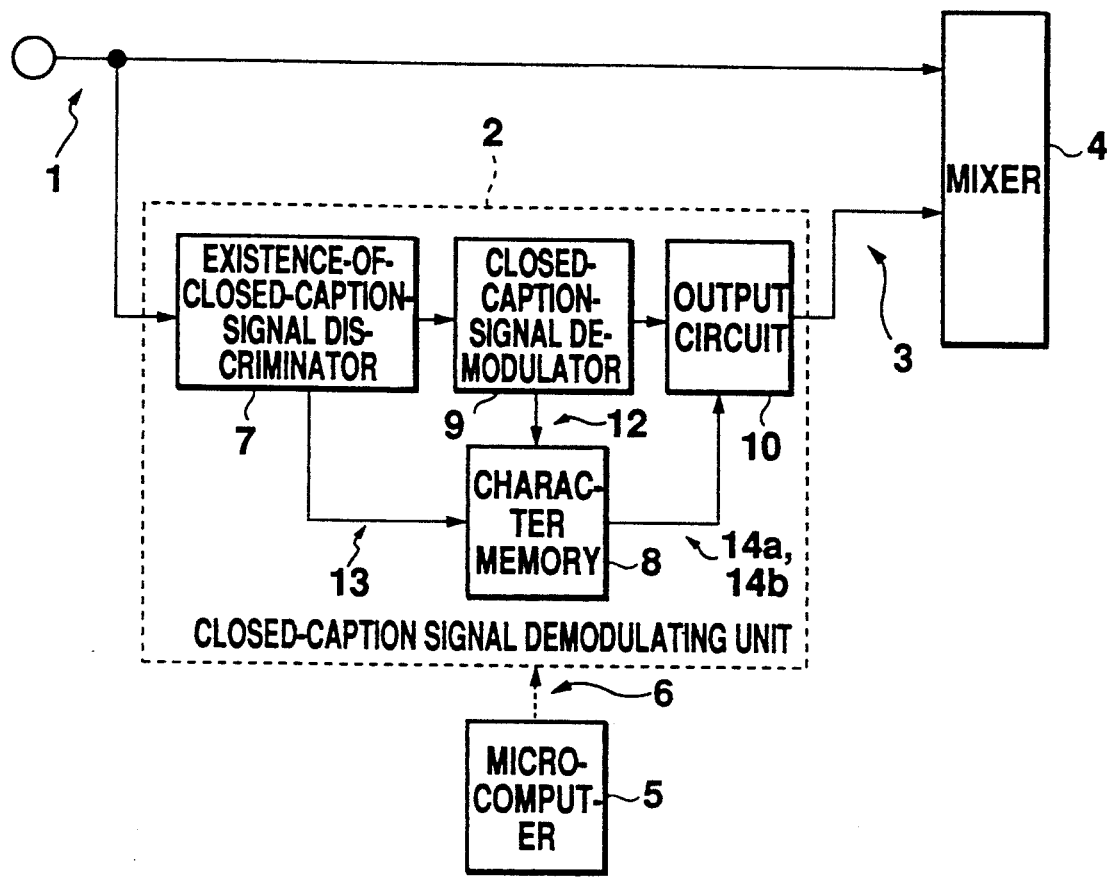
FIG. 1a is a block diagram showing essential part of a television receiver according to one embodiment of this invention.

FIG. 1a is a block diagram showing a television receiver, in which a closed-caption signal demodulating unit is mounted, a preferred embodiment of the present invention.

For a feature of this invention, as shown in FIG. 1a, an existence-of-closed-caption-signal discriminator 7 for discriminating whether or not a closed-caption signal 3 exists in an input image signal is located on the upstream or signal input side of a closed-caption signal demodulator 9.

Therefore, a judgement signal 13 judging that there exists a closed-caption signal 3 in the image signal 1 is output from the existence-of-closed-caption-signal discriminator 7 to a character memory 8. When it inputs the judgment signal indicating "existence of closed-caption signal", the character memory 8 outputs to an output circuit 10 a character signal 14b from which the user can recognize that there exists the closed-caption signal 3 in the image signal 1. The character memory 8 also outputs to the output circuit 10 another character signal 14a corresponding to a code signal 12 in the image signal 1 as sampled by the closed-caption signal demodulator 9.

Figure 2:
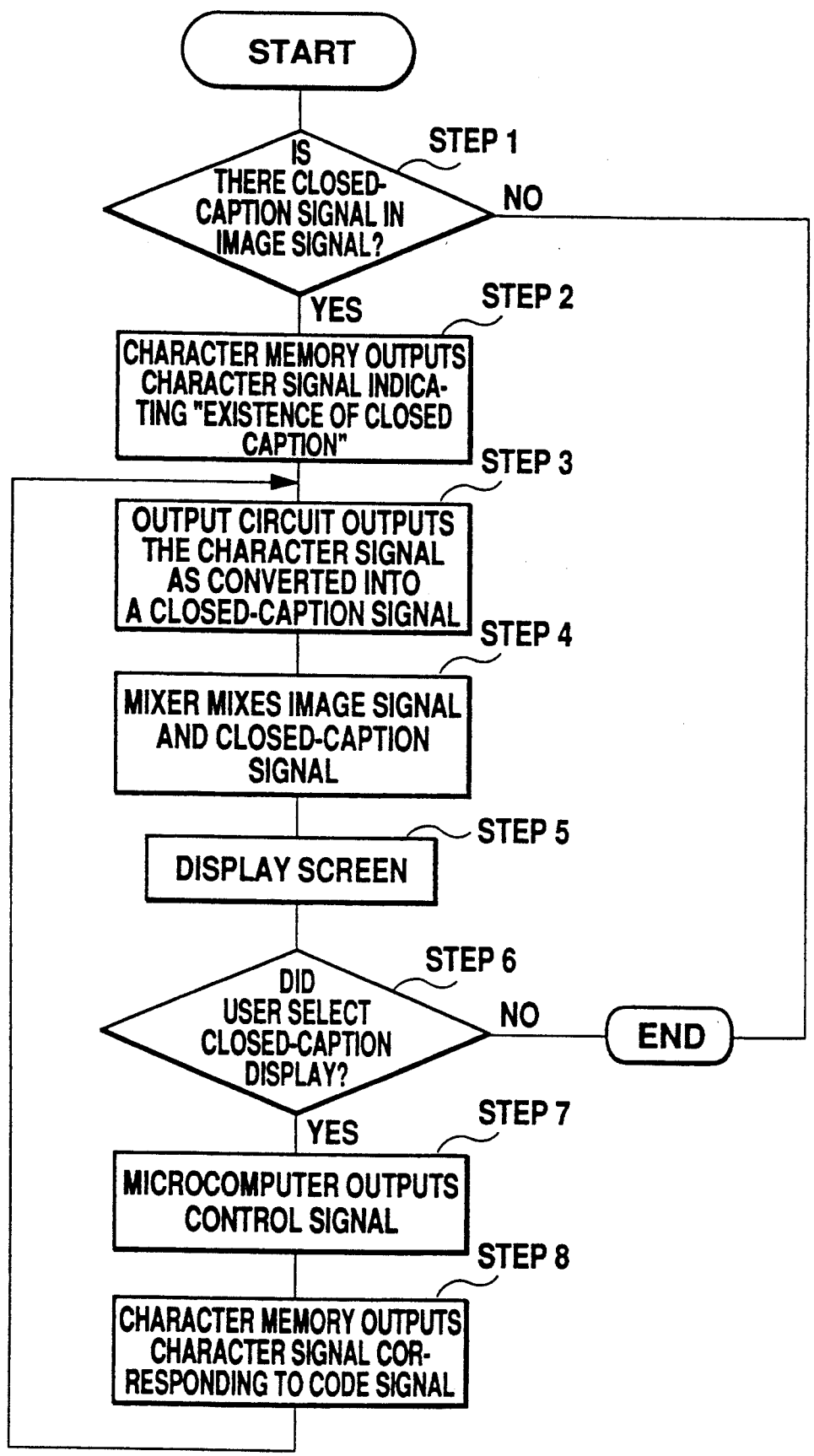
FIG. 2 is a flow diagram showing the operation of the television receiver of FIG. 1.

FIG. 2 is a flow diagram showing how the closed-option character is displayed on the screen.

Firstly the existence-of-closed-caption-signal discriminator 7 discriminates whether or not a closed-caption signal 3 exists in the input image signal 1 (Step 1). In the absence of the closed-caption signal 3, only the image signal 1 will be inputted to a mixer 4, during which time the character signal demodulator 9 will not be activated.

In the existence of the closed-caption signal 3, the character memory 8 outputs to the output circuit 10 a character signal 14b meaning "existence of closed-caption", irrespective of a closed-caption signal demodulation/control signal 6 from a microcomputer 5 (Step 2). Preferably, the character signal 14b may be "C" or "CC" for the caption mode, "T" for the text mode, and "EDS" for the extended data service.

A position signal (indicating a selectable position of character signal 14b on the T.V. screen) is added to the character signal 14b to obtain a closed-caption signal 3 which is to be output from the output circuit 10 to the mixer 4 (Step 3). The mixer 4 mixes the image signal 1 and the closed-caption signal 3 (Step 4), and then a simple character meaning "existence of closed-caption signal" will be displayed on the screen (not shown) of the television receiver (Step 5).

When the user recognizes from this simple character that closed-caption broadcast is available and subsequently selects closed-caption display (Step 6), a control signal 6 for "demodulate the closed-caption signal" will be output to the closed-caption signal demodulator 9 from the microcomputer 5 (Step 7). Based on the control signal 6, the closed-caption signal demodulator 9 samples a code signal 12 from the image signal 1 and outputs the code signal 12 to the character memory 8. Namely, the closed-caption signal demodulator 9 remains in a wait state until the closed-caption display is selected by the user.

In the character memory 8, a character signal 14a corresponding to the code signal 12 is output to the output circuit 10 (Step 8). Then a position signal (indicating a selectable position of character signal 14a on the T.V. screen) is added to the character signal 14a to obtain a closed-caption signal 3 which is to be output from the output circuit 10 to the mixer 4 (Step 3). In the mixer 4, the image signal 1 and the closed-caption signal 3 are mixed (Step 4), and the closed caption is displayed on the screen (not shown) of the television receiver (Step 5).

In this embodiment, the simple character meaning "existence of closed-caption signal" and the position of closed caption display are input to the output circuit 10 beforehand. Alternatively the closed-caption signal demodulator 9 may also demodulate the position signal to synchronize it with the closed-caption signal.

In the foregoing description, this invention is applied to a television receiver in which a decoder for closed-caption broadcast is mounted. The invention may be a decoder separate from an existing television receiver so that a simple character meaning "existence of closed caption signal" and closed-caption broadcast can be displayed on the screen.

Figure 1B:
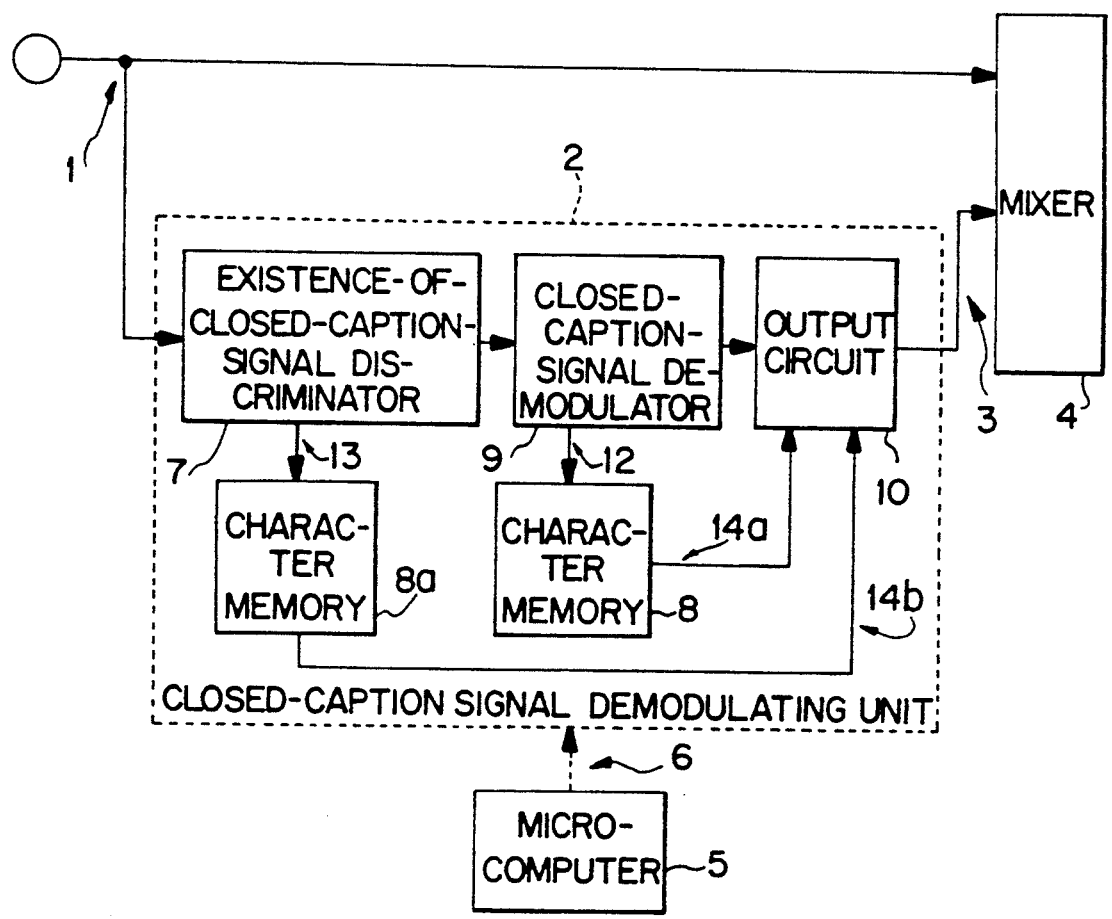
FIG. 1b is a block diagram showing a part of a television receiver according to another embodiment of this invention.

In this embodiment, also a simple character meaning "existence of closed-caption signal" is read from the character memory 8. Alternatively such a simple character may be read from another character memory 8a independent of the character memory 8 as shown in FIG. 1b.

Further in this embodiment, also while a closed-caption signal is displayed on the screen, a simple character meaning "existence of closed-caption signal" is displayed on the screen. Alternatively, display of the simple character meaning "existence of closed-caption signal" may be continued for a predetermined time, e.g., may terminate when the user selects closed-caption display.

With the television receiver, for closed-caption broadcast, of this invention, since the existence-of-closed-caption-signal discriminator is located upstream of the closed-caption signal demodulator, a simple character can be read from the character memory by a judgment signal, which is output from the existence-of-closed-caption-signal discriminator and means "existence of closed-caption signal", and can be displayed on the screen of the television receiver. Accordingly the user can recognize, from the simple character displayed on the screen of the television receiver, whether or not closed-caption broadcast is available in the television broadcast now on air.

Further, since this television receiver includes a controller for controlling the closed-caption signal demodulator to cause closed-caption display on the screen, the user can recognize, from the simple character displayed on the screen of the television receiver, whether or not closed-caption broadcast is available in the television broadcast now on air, and then can select closed-caption broadcast.

Likewise with the decoder, for closed-caption broadcast, of this invention, since the existence-of-closed-caption-signal discriminator is located upstream of the closed-caption signal demodulator, a simple character can be read from the character memory by a judgment signal, which is output from the existence-of-closed-caption-signal discriminator and means "existence of closed-caption signal", and can be displayed on the screen of the external television receiver. Accordingly the user can recognize, from the simple character displayed on the screen of the external television receiver, whether or not closed-caption broadcast is available in the television broadcast now on air.

Further, since this television receiver includes a controller for controlling the closed-caption signal demodulator to cause closed-caption display on the screen, the user can recognize, from the simple character displayed on the screen of the external television receiver, whether or not closed-caption broadcast is available in the television broadcast now on air, and then can select closed-caption broadcast.

What is claimed is:

1. A television receiver for closed-caption broadcast in which an image signal and a closed-caption signal are to be displayed on a viewable screen of the receiver, comprising:
   (a) a closed-caption signal demodulating unit for demodulating a closed-caption signal in an image signal of television broadcast and for outputting the demodulated closed-caption signal for closed-caption display, said closed-caption signal demodulating unit including
      (i) an existence-of-closed-caption-signal discriminator for discriminating whether or not a closed-caption signal exists, for closed-caption broadcast, in an image signal of television broadcast, (ii) a first memory for outputting a predetermined simple existence of closed-caption character in response to said existence-of-closed-caption-signal discriminator judging that the closed-caption signal exists, and (iii) an output circuit for receiving the simple existence of closed-caption character output from said first memory and for converting the simple existence of closed-caption character into a closed-caption signal;

(b) a mixer for mixing the closed-caption signal, which is output from said output circuit, with the image signal and for outputting the composite signal as a screen display signal
for displaying an image on a viewable screen of the receiver, whereby a viewer may recognize, from the simple existence of closed-caption character displayed on the viewable screen, if closed-caption broadcast is available or not.

2. The television receiver of claim 1, wherein, said closed-caption signal demodulating unit (a) further includes (iv) a closed-caption signal demodulator located downstream of said existence-of-closed-caption-signal discriminator for demodulating a code signal to generate the closed-caption signal from the image signal of television broadcast,
said first memory (ii) of said closed-caption signal demodulating unit (a) outputs a character signal corresponding to the code signal output from said closed-caption signal demodulator,
said output circuit (iii) of said closed-caption signal demodulating unit (a) receives the character signal, for closed-caption, outputted from said first memory, and converts the character signal into a closed-caption signal; and
said television receiver further comprises
(c) a controller for controlling said closed-caption signal demodulator to perform closed-caption display upon the viewer recognizing, from the simple existence of closed-caption character displayed on the viewable screen, that closed-caption broadcast is available and upon selecting closed-caption broadcast.

3. The television receiver of claim 1, wherein, said closed-caption signal demodulating unit further includes (iv) a closed-caption signal demodulator located downstream of said existence-of-closed-caption-signal discriminator for demodulating a code signal to generate the closed-caption signal from the image signal of television broadcast, and (v) a second memory, for closed-caption display, for outputting a character signal corresponding to the code signal output from said closed-caption signal demodulator;
said output circuit (iii) of said closed-caption signal demodulating unit (a) receives the simple existence of closed caption character output from the first memory and the character signal output from the second memory and converts the simple existence of closed captioned character and the character signal into a closed-caption signal; and
said television receiver further comprises (c) a controller for controlling said closed-caption signal demodulator to perform closed-caption display upon the viewer recognizing, from the simple existence of closed-caption character displayed on the viewable screen, that closed-caption broadcast is available and selecting closed-caption broadcast.

4. The television receiver of claim 1, wherein the predetermined simple existence of closed-caption character is displayed on the viewable screen as CC.

5. The television receiver of claim 2, wherein the predetermined simple existence of closed-caption character is displayed on the viewable screen as CC.

6. The television receiver of claim 3, wherein the predetermined simple existence of closed-caption character is displayed on the viewable screen as CC.

7. A decoder, for closed-caption broadcast, which receives an input image signal of television broadcast, samples a closed-caption signal for closed-caption broadcast and mixes the closed-caption signal with the image signal, said decoder comprising:

(a) a closed-caption signal demodulating unit for demodulating a closed-caption signal in an image signal of television broadcast and for outputting the demodulated closed-caption signal for closed-caption display, said closed-caption signal demodulating unit including (i) an existence-of-closed-caption-signal discriminator for discriminating whether or not a closed-caption signal exists, for closed-caption broadcast, in an image signal of television broadcast, (ii) a first memory for outputting a predetermined simple existence of closed caption character in response to said existence-of-closed-caption-signal discriminator judging that the closed-caption signal exists, and (iii) an output circuit for receiving the simple existence of closed-caption character output from said first memory and for converting the simple existence of closed-caption character into a closed-caption signal; and (b) a mixer for mixing the closed-caption signal, which is output from said output circuit, with the image signal and for outputting the composite signal as a screen display signal, for subsequent output to an external television receiver.

8. The decoder of claim 4, wherein, said closed-caption signal demodulating unit (a) further includes (iv) a closed-caption signal demodulator located downstream of said existence-of-closed-caption-signal discriminator for demodulating a code signal to generate the closed-caption signal from the image signal of television broadcast,
said first memory (ii) of said closed-caption signal demodulating unit (a) outputs a character signal corresponding to the code signal output from said closed-caption signal demodulator,
said output circuit (iii) of said closed-caption signal demodulating unit (a) receives the character signal, for closed-caption, outputted from said first memory, and converts the character signal into a closed-caption signal; and
(c) a controller for controlling said closed-caption signal demodulator to perform closed-caption display on a viewable screen of the external television receiver upon a viewer of the external television receiver recognizing, from the simple existence of closed-caption character displayed on the viewable screen, that closed-caption broadcast is available and then upon selecting closed-caption broadcast.

9. The decoder of claim 4, wherein said closed-caption signal demodulating unit further includes (iv) a closed-caption signal demodulator located downstream of said existence-of-closed-caption-signal discriminator for demodulating a code signal to generate the closed-caption signal from the image signal of television broadcast, and (v) a second memory, for closed-caption display, for outputting a character signal corresponding to the code signal output from said closed-caption signal demodulator;

said output circuit (iii) of said closed-caption signal demodulating unit (a) receives the simple existence of closed-caption character output from the first memory and the character signal output from the second memory and converts the simple existence of closed-captioned character and the character signal into a closed-caption signal; and (c) a controller for controlling said closed-caption signal demodulator to perform closed-caption display on a viewable screen of the external television receiver upon a viewer of the external television receiver recognizing, from the simple existence of closed caption character displayed on the viewable screen, that closed-caption broadcast is available and then upon selecting closed-caption broadcast.

10. The decoder of claim 4, wherein the predetermined simple existence of closed-caption character is output to the external television receiver and is displayed as CC.

11. The decoder of claim 5, wherein the predetermined simple existence of closed-caption character is output to the external television receiver and is displayed as CC.

12. The decoder of claim 6, wherein the predetermined simple existence of closed-caption character is output to the external television receiver and is displayed as CC.

* * * * *